United States Patent [19]

Kobayashi et al.

[11] 4,071,591
[45] Jan. 31, 1978

[54] METHOD OF MANUFACTURING FOAMED THERMOPLASTIC RESIN PROFILES

[75] Inventors: Seizo Kobayashi; Toshiharu Hirayama, both of Yokohama; Takeshi Kamiya, Kamakura; Seiju Kezuka; Hidesuke Takeuchi, both of Yokohama, all of Japan

[73] Assignee: Nippon Petrochemicals Co. Ltd., Tokyo, Japan

[21] Appl. No.: 603,766

[22] Filed: Aug. 11, 1975

Related U.S. Application Data

[63] Continuation-in-part of Ser. No. 367,806, June 7, 1973, abandoned.

[51] Int. Cl.² ............................................. B29D 27/00
[52] U.S. Cl. .................... 264/45.3; 264/45.5; 264/54; 264/177 R; 264/DIG. 14; 264/DIG. 18
[58] Field of Search ............ 264/45.5, 48, 54, DIG. 5, 264/DIG. 14, 53, 177 R, 45.3

[56] References Cited

U.S. PATENT DOCUMENTS

| 3,278,466 | 10/1966 | Cram et al. ............... 264/DIG. 5 |
| 3,470,119 | 9/1969 | Benning et al. ............... 264/54 X |
| 3,764,642 | 10/1973 | Boutillier ............... 264/48 X |
| 3,773,877 | 10/1973 | Baker et al. ............... 264/48 |
| 3,776,989 | 12/1973 | Annis et al. ............... 264/53 |
| 3,857,914 | 12/1974 | Aisaima et al. ............... 264/45.5 |
| 3,874,981 | 4/1975 | Hayashi et al. ............... 264/45.5 X |
| 3,879,505 | 4/1975 | Boutillier et al. ............... 264/48 |
| 3,922,328 | 11/1975 | Johnson ............... 264/48 X |
| 3,931,379 | 1/1976 | Cruson et al. ............... 264/45.5 |
| 3,937,447 | 2/1976 | Alwes et al. ............... 264/54 X |

OTHER PUBLICATIONS

Hansen; Ralph H. and William M. Martin, "Novel Methods for the Production of Foamed Polymers," In I & EC Product Research and Development, vol. 3, No. 2, June 1964, pp. 137-141.
Brydson; J. A. Plastics Materials, Princeton N. J. D. Van Nostrand, 1966, pp. 33-35.

*Primary Examiner*—Philip Anderson
*Attorney, Agent, or Firm*—Anthony J. Casella; Joseph A. Calvaruso

[57] ABSTRACT

A method for producing foamed thermoplastic resin profiles with an outer skin layer of increased hardness and an inner foam structure which may be used in place of wooden articles. The outer skin has a smooth surface and a good appearance, and the inner portion enclosed by the skin has a uniform foam structure. Also, with this method an improved foaming efficiency can be obtained. The method comprises a step of melting and kneading a mixture consisting of a thermoplastic resin and a foaming agent without causing the gasification of the foaming agent, a step of heating the melted and kneaded mixture obtained in the previous step to cause the gasification of the foaming agent without agitating the mixture and under a pressure sufficient to supress the substantial foaming of the mixture, thereby forming an expandable melted resin mixture containing microbubbles which are prevented from gathering and uniting, and a third step of causing the melted resin obtained in the previous step to expand while cooling the resin by leading the resin to a foaming die under low temperature and low pressure conditions.

6 Claims, 9 Drawing Figures

FIG. 1
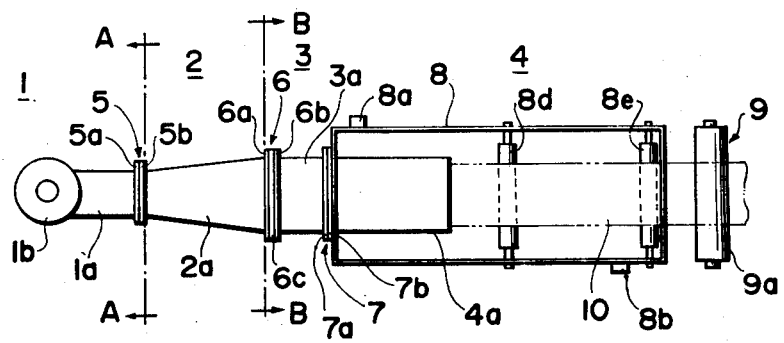
FIG. 2
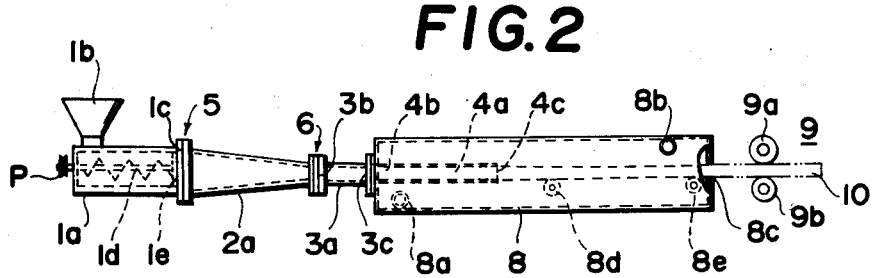
FIG. 3  FIG. 4  FIG. 5
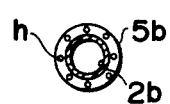 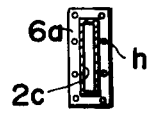 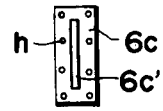
FIG. 6  FIG. 7
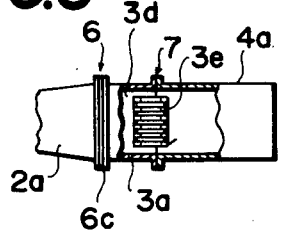 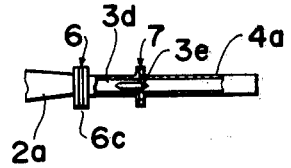

METHOD OF MANUFACTURING FOAMED THERMOPLASTIC RESIN PROFILES

CROSS REFERENCE TO RELATED APPLICATION

This application is a continuation-in-part of the co-pending U.S. application Ser. No. 367,806, filed June 7, 1973, now abandoned.

The present invention relates to methods of manufacturing foamed thermoplastic resin profiles.

The foamed thermoplastic resin article obtainable by the method according to the present invention has an outer skin of increased hardness and smooth and beautiful appearance and a uniformly foamed inner structure, and it may be used primarily as a substitute for wood.

In the prior-art methods of extruding foamed thermoplastic resin articles, bubbles tend to gather and be united together, so that it is difficult to maintain microbubbles in an evenly distributed state. Also, the gas contained in the bubbles tend to escape, thus reducing the effective utilization of the decomposition gas of the foaming agent. Further, though the foamed body in the melted state just emerging from the die has a good surface, the solidified foamed profile is liable to have a surface with unseeming patterns or traces of rupture of bubbles due to the escapement of the gas in the course of solidification of the foamed body by cooling, so that it is difficult to obtain foamed articles with good appearance. This tendency is particularly pronounced with polyolefine resins.

By the method according to the present invention the escapement of the gas can be reduced to increase the foaming efficiency of foaming agents, and also it is possible to obtain a foamed body with a very smooth outer skin containing densely distributed microbubbles and substantially uniform inner foam structure.

The essential feature of the invention resides in a method of manufacturing foamed thermoplastic resin bodies, which comprises a first step of melting and kneading in an extruder a mixture of a thermoplastic resin and a foaming agent having a decomposition temperature or boiling point higher than the melting point or softening point of the resin, the mixture being heated to a temperature below the decomposition temperature or boiling temperature of the foaming agent and above the melting point of softening point of the resin, a second step of introducing the resultant melted mixture into a thermally decomposing means and heating it to a temperature above the decomposition temperature or boiling point of the foaming agent without agitating the mixture and under a pressure sufficient to suppress the substantial foaming of the melted mixture, a third step of causing the melted mixture obtained in the previous step to expand by introducing it into a foaming die held under conditions of low temperature (but above the melting point or softening point of the resin) and low pressure, the expansion being confined only to the inner portion of the mixture with the surface portion being brought into contact with the inner wall of the die and the densely distributed microbubbles contained in the surface portion being substantially restrained from expanding due to the cooling, and a fourth step of cooling the foamed body to a temperature below the softening temperature of the resin, while forcing the foamed body through a sizing die. Said thermally decomposing means generally has the form of a passage or channel having an outlet of such smaller cross-section that its inlet that a sufficient pressure is maintained on the melt to suppress substantial foaming in the melt. Said foaming die generally has the form of a passage or channel having an outlet of larger cross-section than its inlet, or a passage or channel of gradually increasing cross-section in the direction of extrusion, so as to provide the pressure reduction required for the melt to expand. The walls of the foaming die are maintained at such low temperature, above the softening temperature of the polyolefine, as to cool, and thereby suppress substantial foaming in the exterior surfaces of the melt which are in contact with those walls. Said sizing die generally has the form of a passage or channel of constant cross-section throughout, and its walls are adapted to cool and solidify the exterior surfaces of the foamed body which are in contact with those walls, within 10 seconds after the body has been introduced into the sizing die.

By the term "suppressing substantial foaming" is meant the gasification of the foaming agent by heating the mixture of the thermoplastic resin and the foaming agent, without agitating the mixture, under such increased pressure that the bubbles produced are held in a minimum size and are kept uniformly distributed, without gathering and uniting together.

In order to obtain a further smooth outer surface of the foamed body by the method according to the invention, it is particularly preferable to solidify in the sizing die the surface portion of the foamed melt, which contains densely distributed microbubbles, within 10 seconds after the departure of the melt from the foaming die, while allowing the inner portion to further expand before solidification by cooling, whereby the foamed and solidified body may be continuously taken out from the outlet of the sizing die.

In a preferred application of the method according to the invention, a plurality of foaming agents having different decomposition temperatures or boiling points higher than the melting point or softening point of the thermoplastic resin are added to the resin, and the melted mixture obtained by heating the mixture in an extruder to a temperature below the decomposition temperature or boiling point of any of the plurality of foaming agents and above the melting point or softening point of the resin is introduced into a thermally decompositing means and heated there to a temperature intermediate between the highest and lowest decomposition temperatures or boiling points of the foaming agents to cause gasification of the foaming agents having lower decomposition temperatures or boiling points without causing the gasification of the foaming agents having higher decomposition temperatures or boiling points so as to obtain a melted resin mixture containing uniformly distributed expandable microbubbles under a pressure sufficient to suppress the substantial foaming due to the foaming agents having the lower decomposition temperatures or boiling points. The expandable melt thus obtained is subsequently introduced into a foaming die whose melt passage is maintained at a temperature and pressure lower than in the preceding step and also is provided with a heater, whereby the foaming of the melt is caused only in the inner portion thereof, the surface layer with densely distributed microbubbles brought into contact with the inner wall of the die being substantially restrained from foaming due to cooling, whereas the foaming agent with higher decomposition temperatures or boiling points being gasified by the heater provided in the melt passage. By this method, it is possible to obtain foamed bodies having a skin layer and core of desired degrees of expansion by appropriately adjusting the proportions of the foaming agents having different decomposition temperatures or boiling points to be incorporated in the resin. To obtain a core of an excellent foamed state the downstream end of the heater preferably extends into the sizing die. To this end, it is also preferable to solidify the surface layer containing densely distributed microbubbles by cooling within 10 seconds after the melt is introduced into the sizing die while causing further expansion of the inner portion or core before solidification by cooling.

According to the invention, polyvinyl chloride, polystyrene, acrylonitrile-butadiene-styrene resins and polyolefine may be advantageously used as the thermoplastic resin material. Particularly, polyolefines may be most effectively used.

Also, a mixture of two or more polyolefines may be used as well as a single type of polyolefine. Further, one or more other thermoplastic resins and/or rubbers may be added to the polyolefine or polyolefine mixture to an extent insufficient to alter the basic properties of the polyolefine material.

Furthermore, a slightly crosslinked polyolefine retaining its thermoplasticity obtained by crosslinking treatment of a mixture of a polyolefine or polyolefine composition and 0.01 to 1 weight percent of a crosslinking agent, may be effectively used. As the crosslinking agent may be used generally known organic or inorganic peroxides, hydroperoxides, peracids, metal alkyl compounds, metal aryl compounds and combinations of these compounds.

According to the invention, single polyolefines, mixtures of two or more polyolefines, admixtures composed of a polyolefine or polyolefine composition and one or more other resins added to an extent insufficient to alter the basic properties of the polyolefines, and crosslinking polyolefines obtained through crosslinked treatment with 0.01 to 1 weight percent of a crosslinking agent as mentioned earlier are all referred to merely as polyolefine.

In order to obtain a foamed body having a smooth and wood-like appearance by the method according to the invention, it is usually preferable to incorporate 1 to 20 weight percent of glass fiber with fiber length of 3 mm or more, and particularly pronounced effects may be obtained in case of using polyolefine.

Moreover, if it is found necessary, such additives as pigments and inorganic fillers may be incorporated into the thermoplastic resin.

The chemical foaming agent that can be used according to the invention has a decomposition temperature higher than the melting point or softening point of the resin. As the suitable chemical foaming agent may be mentioned azodicarbonamide, dinitrosopentamethylene tetramine, azobisisobutylonitrile, p,p'-oxybis (benzene sulfonylhydrazide), p-toluene sulfonylsemicarbazide, trihydrazotriazine and sodium bicarbonate. According to the invention, heating a chemical foaming agent to a temperature above its decomposition temperature is referred to as gasifying the foaming agent.

An example of the apparatus for carrying out the invention will now be described in connection with the accompanying drawings together with individual steps in one embodiment of the invention.

The drawings illustrate an example of the apparatus for carrying out the invention, and in which:

FIG. 1 is a plan view of the apparatus;

FIG. 2 is a front view, partly broken away, showing the apparatus of FIG. 1;

FIG. 3 is a section taken along line A—A in FIG. 1;

FIG. 4 is a section taken along line B—B in FIG. 1;

FIG. 5 is a side view of a throttle plate;

FIG. 6 is a plan view, partly broken away, showing a heater provided in the apparatus of FIG. 1; and FIG. 7 is a front view, partly broken away, showing the same part as shown in FIG. 6.

Figure 8:
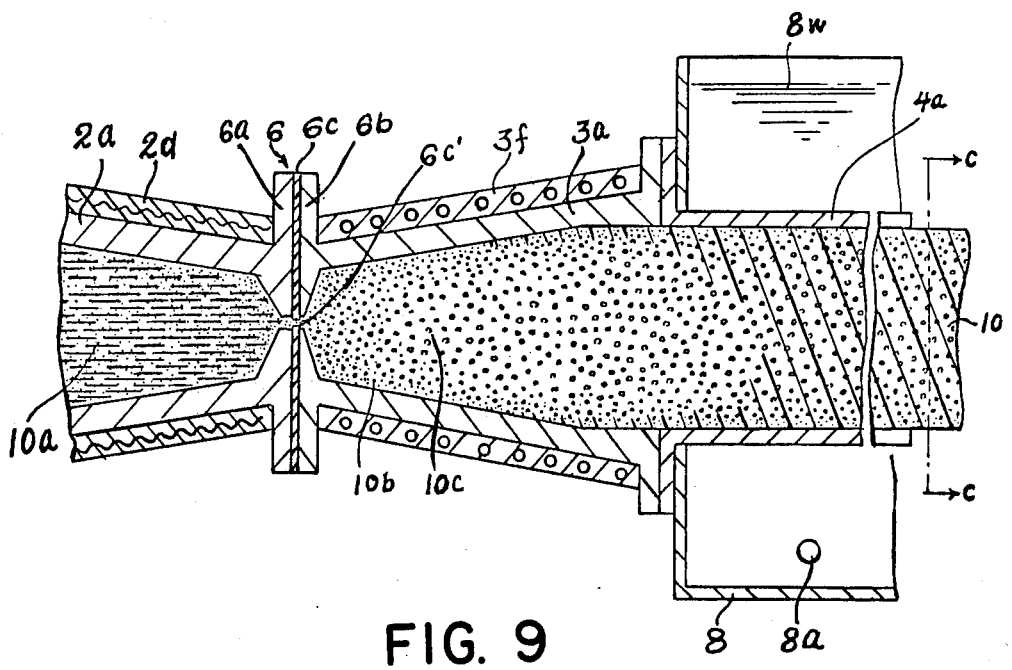
FIG. 8 is an enlarged sectional view of a portion of the subject apparatus as illustrated in FIG. 2.
Figure 9:
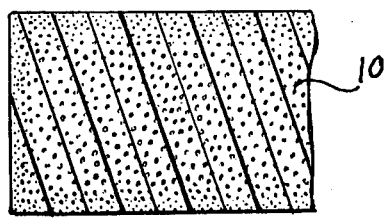
FIG. 9 is a sectional view, partly broken away, taken along line c—c of FIG. 8.

Referring now to FIGS. 1 and 2, reference symbol 1 designates a first step section. Symbol 1a designates a heating and mixing cylinder of an extruder employed in this step, symbol 1b a hopper, symbol 1c an outlet of the extruder, symbol 1d a screw, and symbol 1e a screen pack. Although not shown in the Figures, a heating means for melting the thermoplastic resin without gasifying the foaming agent is provided on the outside of the heating and mixing cylinder 1a, and with this heating means the mixture of foaming agent and thermoplastic resin may be held in the melted blend state.

Symbol 2 desginates a second step section consists of a thermally decomposing means including a heating channel or passage 2a having an inlet 2b and an outlet 2c and a gradually decreasing cross-sectional area in the direction of the extrusion. The area of the outlet 2c is made smaller than that of the inlet 2b, whereby a required pressure may be applied to the melted mixture introduced from the extruder of the first step section. Heating means 2d is provided on the outside of the thermally decomposing means 2a to elevate the temperature of the melted mixture passing through this means so as to gasify the foaming agent. The required temperature and pressure in the thermally decomposing means vary depending upon the thermoplastic resin and foaming agent used. The internal pressure may be adjusted by varying the ratio of the area of the outlet 2c to that of the inlet 2b. Alternatively, similar effects may be obtained simply by providing a throttle plate 6c. The temperature control is done by controlling the heating means provided on the outside of the thermally decomposing means 2a.

Symbol 3 designates a third step section. This section consists of a foaming die 3a having an inlet 3b and an outlet 3c. The foaming die 3a has such a structure that its passage flares in the direction of extrusion, that is, from its inlet 3b toward its outlet 3c. More particularly, the foaming die 3a generally has the form of a passage or channel having an outlet 3c of larger cross-section than its inlet 3b, or a passage or channel or gradually increasing cross-section in the direction of extrusion, so as to provide the pressure reduction required for the melt to expand. The walls of the foaming die 3a are maintained by cooling element 3f at such low temperature, above the softening temperature of the resin, so as to cool, and thereby suppress substantial foaming in the exterior surfaces of the melt which are in contact with those walls.

Symbol 4 designates a fourth step section. This section includes a sizing die 4a having an inlet 4b and an outlet 4c. This sizing die is disposed within water in a cooling water trough 8 except for its inlet.

Symbol 5 designates a juncture between the extruder 1a in the first step section and the thermally decomposing means 2a in the second step section. Symbol 5a designates an outlet side flange of the extruder, and symbol 5b an inlet side flange of the thermally decomposing means.

Symbol 6 designates a juncture between the thermally decomposing means 2a in the second step section and the foaming die 3a in the third step section. Symbol 6a designates an outlet side flange of the thermally decomposing means, and symbol 6b an inlet side flange of the foaming die. Symbol 6c designates a throttle plate inserted between the flanges 6a and 6b. By having several throttle plates 6c of different throttle apertures 6c', the adjustment of the pressure applied to the melted mixture within the thermally decomposing means may be conveniently made by merely changing the throttle plate. The ratio of the area of the inlet 2b and that of the outlet 2c varies depending upon the kind, temperature and speed of the melted mixture, but in many cases satisfactory results can be obtained by setting the outlet area to be less than 1/10 of the inlet area.

Symbol 7 designates a juncture between the foaming die 3a in the third step section and the sizing die 4a in the fourth step section. Symbol 7a designates an outlet side flange of the foaming die 3a, and symbol 7b an inlet side flange of the sizing die 4a.

Symbol p designates a pulley. The individual flanges have bold holes h receiving bolts not shown. The cooling water trough 8 has a cooling water inlet 8a and a cooling water outlet 8b. Symbol 9 designates a take-off means consisting of a pair of rollers 9a and 9b. Symbols 8d and 8e designate guide rollers to guide the product 10 to the take-off means 9, and symbol 8c a product withdrawal hole formed in the water trough wall.

Referring to FIGS. 6 and 7, symbol 3e designates a heater disposed within the melt passage 3d of the foaming die 3a. Although the detailed construction of the heater is not shown, it may consist of a heat radiator such as a nichrome wire covered with an insulator and accommodated in a metal casing. The outer wall of the metal casing is preferably formed with recesses or grooves extending in the direction of flow of the melted resin. The heater is preferably so disposed that its downstream end finds itself in the inlet of the sizing die of the fourth step section. This heater 3e is employed in special applications of the inventions where two or more foaming agents having different decomposition temperatures or boiling points are used in combination.

In the first step section, a thermoplastic resin and a foaming agent are mixed without gasifying the foaming agent. At this time, the foaming agent has a decomposition temperature or boiling point higher than the temperature required to melt the thermoplastic resin. The melted mixture thus obtained is forced into the thermally decomposing means in the second step section.

In the second step section, the melted mixture obtained in the extruder 1a of the first step section is heated within the thermally decomposing means 2a to a temperature above the decomposition temperature or boiling point of the foaming agent, while suppressing substantial foaming to prevent the gathering and uniting of microbubbles and obtain uniform distribution thereof in the melted resin. The suppression of substantial foaming in this step for preventing the gathering and uniting of microbubbles can be obtained because the gasification of the foaming agent is effected by heating and by the application of the aforementioned required pressure in the thermally decomposing means without effecting stirring therein. The foamable melt 10a thus obtained with the substantial foaming suppressed and microbubble uniformly distributed is introduced to the foaming die 3a of the third step section.

In the third step section, the foamable melt 10a obtained in the thermally decomposing means 2a of the second step is led into the foaming die 3a held at a temperature lower than the temperature of the melt introduced and above the melting point or softening point of the resin to cause foaming under reduced pressure. Of the foamable melt 10a introduced into the foaming die 3a, a thin layer portion 10b brought into contact with the inner wall of the die as the melt proceeds through the die will not foam due to a temperature reduction, and only the rest, that is, the inner portion 10c of the melt, foams. The non-foamed thin layer portion forms a surface layer remaining in the melted state containing densely distributed microbubbles as it proceeds to the next step section. In this pressure reduction foaming step the foaming die 3a is held at a temperature lower than the temperature of the foaming melt but above the melting point or softening point of the resin. This is done so because otherwise, that is, at a die temperature below the melting or softening point of the resin, cooling would proceed to the inner portion, so that satisfactory expansion could not be obtained.

The foamed body thus obtained, which remains melted and is surrounded by the surface layer with densely distributed microbubbles, proceeds from the foaming die 3a to the sizing die 4a in the fourth step section.

In the fourth step section, the non-solidified foam emerging from the foaming die 3a of the third step section is introduced into the sizing die 4a for solidifying the surface layer with densely distributed microbubbles by rapid cooling, followed by cooling and solidifying the inner portion of the foam by introducing the foam into water 8w. As the foam is cooled and solidified, it becomes a continuous strip-like body having a smooth and beautiful surface, which is continuously taken off by the take-off means 9.

The sizing die 4a in the fourth step section should be so designed that it has a cooling capacity of cooling the surface layer with densely distributed microbubbles down to a temperature below the melting point or softening point of the layer within 10 seconds after the foam in the melted state is introduced into it, that is, after the departure of the foam from the foaming die 3a. To this end, it is preferable to construct the sizing die with materials of high thermal conductivity such as aluminum alloys and copper-berylium alloys, but this end may also be achieved by increasing the heat radiating area of the sizing die. Also, the cooling water may be effectively re-used by putting it through a refrigerator. The cooling time of within 10 seconds here is very important. If the cooling is applied for more than 10 seconds, the microbubbles in the surface layer formed in the foaming die 3a are likely to grow. If this results, not only a rough surface would result, but also defoaming would occur, resulting in reduced foaming efficiency.

According to the invention, the foaming of the expandable melt is caused in the third step so that a non-foamed surface layer containing densely distributed microbubbles is formed, and in the fourth step the surface layer is solidified by rapid cooling within 10 seconds, whereby improved foaming efficiency and a smooth and beautiful surface can be successfully obtained. The effect that a foamed layer in a uniformly foamed state can be obtained by the method according to the invention is owing to the fact that substantial foaming is suppressed in the second step while microbubbles are uniformly distributed in the melted resin. The thickness of the surface layer containing densely distributed microbubbles, which is solidified in the fourth step, varies depending upon the cooling condition in the third step, but it is usually 1 to 2 millimeters.

EXAMPLE 1

Apparatus: The apparatus used had the illustrated construction and the following dimensions:

The heating and mixing cylinder 1a of the extruder had an inner diameter of 50 mm.

The thermally decomposing means 2a was 350 mm in length 2a and had an inlet 2b of a diameter of 50 mm and an outlet 2c of 300 mm by 5 mm.

The throttle plate 6c had a thickness of 2 mm and throttle aperture dimensions of 300 mm by 0.5 mm.

The foaming die 3a was 55 mm in length and had an inlet 3b of 300 mm by 5 mm and an outlet 3c of 300 mm by 10 mm.

The first step: A dry blend of high density polyethylene (with melt index of 0.3 and density of 0.95) and 1 weight percent of azodicarbonamide as foaming agent was charged into the hopper 1b, and the screw 1d was driven, the heating means being so adjusted that the resin passing through the heating and mixing cylinder 1a was heated to 170° to 180° C and extruded at a rate of 20 kg/hr. through the screen 1e to the second step section.

The second step: The melted mixture from the previous step was forced into the thermally decomposing means 2a, and as it was forced through the thermally decomposing means it was heated to 210° to 220° C and pressurized to 140 to 150 kg/cm$^2$, whereby the foaming agent was decomposed to produce microbubbles with the substantial foaming suppressed. The resultant melt with microbubbles uniformly distributed in the melted resin proceeded to the next step section.

The third and fourth steps: The melted resin with the substantial foaming suppressed resulting from the previous step was forced into the foaming die 3a, and it foamed as it proceeded through the foaming die 3a with the wall temperature maintained at 140° to 160° C. Then, the foam was cooled as it passed through the sizing die 4a and the cooling water trough 8, and was then taken off by the take-off means 9, thus obtaining a continuous strip-like foamed body 10 of about 10 mm by 300 mm having an outer dense skin layer 1 to 2 mm thick and an uniformly foamed inner portion.

The surface skin layer of the foamed body obtained had smooth appearance, with its foaming factor $$\left(\text{foaming factor} = \frac{\text{specific gravity of solid (or unfoamed resin)}}{\text{specific gravity of foamed product}}\right)$$

being nearly 1. The foaming factor of the whole foamed body inclusive of the skin layer was 2.2, and the utilization factor of the decomposition gas of the foaming agent (foaming efficiency), $$\left(\text{foaming efficiency} = \frac{\text{volume of gas utilized in expanding resin}}{\text{theoretical volume of gas evolved}}\right)$$

was about 45 percent.

REFERENCE EXAMPLE 1

A process similar to Example 1 except that the second step is omitted, the extruder being directly coupled to the foaming die, and that the melt in the extruder was heated to 220° C for decomposing the foaming agent was carried out. The foamed body obtained had a rough appearance, and bubbles of very irregular sizes were contained in the foam. The foaming factor of the whole foam was 1.4, and the foaming efficiency was about 15 percent.

EXAMPLE 2

Apparatus: The same apparatus as in Example 1 was used.

The first step: A dry blend of high density polyethylene (with melt index of 0.3 and density of 0.95), 1 weight percent of azodicarbonamide as foaming agent and 0.1 weight percent of 2, 5-dimethyl 2,5-di-(t-butylperoxy) hexyne-3 as cross-linking agent was charged into the hopper 1b, and the screw 1d was driven with the heating means so adjusted, that the resin passing through the heating cylinder 1a was heated to 180° to 185° C and extruded at a rate of 20 kg/hr. while concurrently causing the crosslinking to produce a uniformly mixed melt, which was passed through the screen pack 1e to the second step section.

The second step: The melted mixture from the previous step was forced into the thermally decomposing means 2a, and as it proceeded through the thermally decomposing means, it was heated to 210° to 220° C and pressurized to 140 to 150 kg/cm$^2$, whereby the foaming agent was decomposed to produce microbubbles with the substantial foaming suppressed. The resultant melt with microbubbles uniformly distributed in the melted resin proceeded to the next step section.

The third and fourth steps: The melt with the substantial foaming suppressed resulting from the previous step was passed through the foaming die 3a with its wall temperature maintained at 140° to 160° C to cause the foaming of the melt. Then, the foam was cooled as it passed through the sizing die 4a and the cooling water trough 8 and was then taken off through the take-off means 9, thus obtaining a continuous strip-like foamed body 10 with cross sectional dimensions of about 10 mm by 300 mm having an outer dense skin layer 1 to 2 mm thick and a uniformly foamed inner portion.

The surface skin layer of the foamed body obtained had a smooth appearance, with its foaming factor being nearly 1. The foaming factor of the whole foamed body inclusive of the skin layer was 2.5, and the utilization factor of the decomposition gas of the foaming agent (foaming efficiency) was 55 percent.

REFERENCE EXAMPLE 2

A process similar to Example 2 except that the second step is omitted, the extruder being directly coupled to the foaming die, and that the melt in the extruder was heated to 210° C for decomposing the foaming agent was carried out. The foamed body obtained had a rough appearance, and bubbles of very irregular sizes were contained in the foam. The foaming factor of the whole foam was 1.4, and the foaming efficiency was 20 percent.

EXAMPLE 3

Apparatus: The same apparatus as in Example 1 was used.

The first step: A dry blend of high density polyethylene (with melt index of 0.6 and density of 0.96), 1 weight percent of azodicarbonamide as foaming agent and 20 percent of a rubber-like styrene-bytadiene block co-polymer ("Califlex" TR-3264 supplied by Shell Chemical Company, USA) was charged into the hopper 1b, and the screw 1d was driven with the heating means so adjusted that the resin passing through the heating cylinder 1a was heated to 180° to 185° C and kneaded together with the foaming agent and the synthetic rubber and extruded at a rate of about 20 kg/hr. through the screen pack 1e to the second step section.

The second step: The melted mixture from the previous step was subjected to a step similar to that in Example 1 except that the melt was heated to 210° to 220° C and pressurized to 130 to 140 kg/cm$^2$ as it passed through the thermally decomposing means, the resultant melt being fed to the next step section.

The third and fourth steps: Here the melt was processed in the same way as in Example 1, thus obtaining a similar continuous strip-like foamed body.

The surface skin layer of the foamed body obtained had a smooth appearance, with its foaming factor being nearly 1. Also, the foaming factor of the whole foamed body inclusive of the skin layer was 2.4, and the foaming efficiency was 52 percent.

The foamed body of polyethylene obtained here had resiliency and slightly soft touch compared with the foamed bodies obtained in Examples 1 and 2.

EXAMPLE 4

Apparatus: The apparatus used here had the following dimensions:

The heating and mixing cylinder 1a of the extruder had an inner diameter of 65 mm.

The thermally decomposing means 2a was 350 mm in length and had an inlet 2b of a diameter of 65 mm and an outlet 2c of 300 mm by 5 mm.

The throttle plate 6c had a thickness of 2 mm and throttle aperture dimensions of 300 mm by 0.5 mm.

The foaming die 3a was 55 mm in length and had an inlet 3b of 300 mm by 8 mm, and an outlet 3c of 300 mm by 12 mm.

The sizing die 4a was constructed of duralmin 6 mm in thickness, was 500 mm in length, and had an inlet 4b of 300 mm by 12 mm and an outlet 4c of 300 mm by 12 mm.

The first step: A dry blend of high density polyethylene (with melt index of 1.0, density of 0.96 and melting point of 125° to 129° C) and 1 weight percent of azodicarbonamide as foaming agent was charged into the hopper 1b, and the screw 1d was driven with the heating means so adjusted that the resin passing through the heating and mixing cylinder 1a was heated to 170° to 175° C and kneaded together with the foaming agent and extruded at a rate of 20 kg/hr. through the screen pack 1e to the second step section.

The second step: The melted mixture from the previous step was forced into the thermally decomposing means 2a, and on its way through the thermally decomposing means, it was heated to 210° to 220° C and pressurized to about 145 kg/cm$^2$, whereby the foaming agent was decomposed to produce microbubbles with the substantial foaming suppressed. The resultant melt with microbubbles uniformly distributed in the melted resin proceeded to the next step section.

The third step: The melt with the substantial foaming suppressed resulting from the previous step was forced into the foaming die 3a with its wall temperature maintained at 150° C, whereby its inner portion, which was cooling slower than the outer portion, foamed uniformly whereas the surface layer, which was in contact with the inner wall of the foaming die, did not foam and retained unfoamed densely distributed microbubbles. The resultant system in this state proceeded to the next step section.

The fourth step: The foamed body in the melted state from the previous step was forced into the sizing die 4a, whereby its surface layer brought into contact with the inner wall of a 6 mm thick Duralmin sizing die which was water-cooled from outside was solidified through rapid cooling, while its inner portion was gradually cooled as it passed through the cooling water through 8. The solidified foamed body was taken off by the take-off means 9 at a speed of 35 cm/min. The foamed body passing through the sizing die was solidified at a position about 3 cm away from the inlet of the sizing die 4a, and the temperature at this position was measured to be 120° C. The foamed body reached this position 5 seconds after it entered the inlet of the sizing die 4a.

The strip-like foamed body thus obtained with cross sectional dimensions of 12 mm by 300 mm had a 1–2-mm thick outer skin layer (surface layer) of a foaming factor of about 1 and a uniformly foamed inner portion, with the foaming factor of the whole body being 2.2. The foaming efficiency was about 45 percent, and the surface of the product was very smooth.

From the results of this example it will be understood that by the method according to the invention not only an excellent foamed body, which has a smooth and beautiful surface and a uniformly foamed inner portion and which could not be obtained by the prior-art methods, may be obtained but also the foaming efficiency is superior to the values of about 15 to 20 percent obtainable according to the prior-art methods.

REFERENCE EXAMPLE 3

A process similar to Example 4 except that the sizing die 4a was made of steel S-45C with a reduced cooling capacity was carried out. The foamed body was cooled to a temperature of 120° C, which is below the melting point of the resin, when the foamed body reached a position about 8 cm away from the inlet of the sizing die 14 seconds after it entered that inlet.

The foamed body obtained in this example has the same foaming factor as that in Example 4, but exhibits numerous small recesses due to rupture of bubbles on its surface.

EXAMPLE 5

Apparatus: The apparatus used here had the following dimensions:

The sizing die 4a was constructed of steel S-45C 6mm in thickness, was provided with grooves, was 500 mm in length, and had an inlet 4b. of 300 mm by 12 mm and an outlet 4c of 300 mm by 12 mm. The thickness of the die wall here is the average value of the thickness of the steel plate formed with grooves, and the non-grooved portion of the steel plate has a thickness of 7.5 mm. The grooves had a depth of 3 mm and a width of 3 mm, spaced at an interval of 3 mm, and extended in the transverse direction. With the provision of these grooves, the heat radiating area was increased to double that in the aforementioned Reference Example 3.

The first to third steps: The same as in Example 4.

The fourth step: This step was also similar to that in Example 4 and Reference Example 3 except that the sizing die 4a was different. The surface of the foamed body passing through the sizing die 4a was solidified at a position about 4 cm away from the inlet of the sizing die 4a, and the temperature at this position was measured to be 120° C. The foamed body reached this point 7 seconds after it entered the inlet of the sizing die 4a.

The foamed body thus obtained had a 2 mm thick smooth and beautiful surface layer (skin layer) of a foaming factor of about 1 and a uniformly foamed inner portion. The foaming factor of the whole body was 2, and the foaming efficiency was 37 percent.

EXAMPLE 6

Apparatus: The apparatus used here had the following dimensions:

The heating and mixing cylinder 1a of the extruder had an inner diameter of 65 mm.

The thermally decomposing means 2a was 300 mm in length and had an inlet 2b of a diameter of 65 mm and an outlet 2c of 120 mm by 8 mm.

The throttle plate 6c had a thickness of 2 mm and throttle aperture dimensions of 120 mm by 0.5 mm.

The foaming die 3a was 550 mm in length and had an inlet 3b of 120 mm by 8 mm and an outlet 3c of 120 mm by 20 mm.

The heater 3e was employed and had a width of 120 mm, a length of 200 mm, a thickness of 16 mm and a watt density of 3 W/cm$^2$.

The sizing die 4a was 1000 mm in length and had an inlet 4b of 120 mm by 20 mm and an outlet 4c of 120 mm by 20 mm.

The first step: A dry blend of high density polyethylene (with melt index of 1.0 and density of 0.96), 1 weight percent of azodicarbonamide (with decomposition temperature of 195° C) as foaming agent A and 0.1 weight percent of "Vinifol SW No. 7" (a product manufactured by Eiwa Kasei Corporation in Japan) (with decomposition temperature of 173° C) as foaming agent B was charged into the hopper 1b, and the screw 1d was driven with the heating means so adjusted that the resin passing through the extruder 1a was heated to 165° C and kneaded together with the foaming agents and extruded at a rate of 20 kg/hr. through the screen pack 1e into the thermally decomposing means 2a.

The second step: While proceeding in the thermally decomposing means 2a the melted mixture was heated to 180° to 185° C and pressurized to 140 to 150 kg/cm$^2$, whereby the foaming agent B was decomposed to produce microbubbles with the substantial foaming suppressed and without the decomposition of the foaming agent A. The resultant melt with microbubbles uniformly distributed in the melted resin proceeded to the next step section.

The third and fourth steps: The melted mixture, while proceeding in the foaming die 3a, was heated to 200° to 250° C except for a surface portion by the heater 3e provided in the die passage 3d, whereby the foaming agent A and any residual non-decomposed part of the foaming agent B were decomposed to cause continued foaming of the inner portion. Then, the foamed body was introduced into the sizing die 4a and cooled as it was brought into contact with the inner wall of the sizing die, and then it was taken off by the take-off means 9 at a speed of 28 cm/min.

The foamed body thus obtained in a strip-like form with sectional dimensions of 120 mm by 12 mm had an about 2 mm thick outer skin layer of a foaming factor of 1.05. The inner portion had a substantially uniform foam structure with a foaming factor of 2.5. The foaming factor of the whole body was 2, and the foaming efficiency of the decomposition gas of the foaming agents was about 40 percent. The surface was very beautiful and looked like wood.

REFERENCE EXAMPLE 4

A process similar to Example 6 except that only the foaming agent A was used and that the thermally decomposing means 2a was held at 200° C without providing the heater 3e but with only the usual external heater was carried out. The foamed body obtained had bad-looking appearance with traces of rupture of bubbles, and bubbles of very irregular sizes were contained in the inner portion. The foaming factor of the whole body was 1.5, and the foaming efficiency was about 15 percent.

EXAMPLE 7

Apparatus: The same apparatus as in Example 6 was used.

The first step: A dry blend of polypropylene (with melt index of 5.0 and density of 0.91), 1 weight percent of a foaming agent "FF 800" (a product manufactured by Eiwa Kasei Corporation and with decomposition temperature of 230° C) as foaming agent A and 0.1 weight percent of azodicarbonamide (with decomposition temperature of 195° C) as foaming agent B was charged into the hopper 1b, and the screw 1d was driven with the heating means so adjusted that the resin passing through the extruder 1a was heated to 190° C and kneaded together with the foaming agents and extruded at a rate of 15 kg/hr. through the screen pack 1e to the thermally decomposing means 2a.

The second step: The melted mixture, while proceeding in the thermally decomposing means 2a, was heated to 200° to 205° C and pressurized to 200 to 210 kg/cm$^2$, whereby only the foaming agent B was decomposed without the foaming agent A being decomposed to produce microbubbles with the substantial foaming suppressed and the microbubbles uniformly distributed in the melted resin, the resultant system proceeding to the next step section.

The third and fourth steps: The melted mixture, while proceeding in the foaming die 3a, was heated to 235° C except for a surface portion by the heater 3e provided in the resin passage, whereby the foaming agent A and any residual non-decomposed part of the foaming agent B were decomposed to cause continued foaming of the inner portion. Then, the foamed body was introduced into the sizing die 4a and cooled as it was brought into contact with the inner wall of the sizing die, and then it was taken off by the take-off means 9 at a speed of 20 cm/min.

The foamed body thus obtained in a strip-like form with sectional dimensions of 120 mm by 20 mm had an about 2 mm thick outer skin layer of a foaming factor of 1.05. The inner portion had a foaming factor of 2.5 and a substantially uniform foam structure. The foaming factor of the whole body was 2, and the surface appearance was beautiful and was like that of wood.

EXAMPLE 8

Apparatus: The same apparatus as in Example 6 was used.

The first step: A dry blend of high impact polystyrene, 1 weight percent of azodicarbonamide (with decomposition temperature of 195° C) as foaming agent A and 0.1 weight percent of sodium bicarbonate (with decomposition temperature of 150° to 160° C) as foaming agent B was charged into the hopper 1b, and the screw 1d was driven with the heating means so adjusted that the resin passing through the extruder 1a was heated to 140° C and kneaded together with the foaming agents and extruded at a rate of 15 kg/mr. through the screen pack 1e to the thermally decomposing means 2a.

The second step: The melted mixture, while proceeding in the thermally decomposing 2a, was heated to 165° C and pressurized to 110 to 120 kg/cm$^2$, whereby only the foaming agent B was decomposed without the foaming agent A being decomposed to produce microbubbles with the substantial foaming suppressed and the microbubbles uniformly distributed in the melted resin, the resultant system proceeding to the next step section.

The third and fourth steps: The melted mixture, while proceeding in the foaming die 3a, was heated to 210° C except for a surface portion by the heater provided in the resin passage, whereby the foaming agent A and any remaining non-decomposed part of the foaming agent B were decomposed to cause continued foaming of the inner portion. Then, the foamed body was introduced into the sizing die 4a and cooled as it was brought into contact with the inner wall of the sizing die, and then it was taken off by the take-off means 9 at a speed of 20 cm/min.

The foamed body thus obtained in a strip-like form with sectional dimensions of 120 mm by 20 mm had an about 2-mm thick outer skin layer of a foaming factor of 1.05. The inner portion had a foaming factor of 3.5 and a substantially uniform foam structure. The foaming factor of the whole body was 2.5, and the surface appearance was beautiful and was like that of wood.

EXAMPLE 9

Apparatus: The apparatus used here had the following dimensions:

The heating and mixing cylinder 1a of the extruder had an inner diameter of 65 mm.

The thermally decomposing means 2a was 350 mm in length and had an inlet 2b of a diameter of 65 mm and an outlet 2c of 300 mm by 5 mm.

The throttle plate 6c had a thickness of 2 mm and throttle aperture dimensions of 300 mm by 0.5 mm.

The foaming die 3e was 55 mm in length and had an inlet 3b of 300 mm by 5 mm and an outlet 3c of 300 mm by 10 mm.

The first step: A dry blend of high density polyethylene (with melt index of 1.0 and density of 0.96), 3 weight percent of glass fiber (with fiber length of 6 mm and manufactured by Nitto Boseki Corporation in Japan) and 1 weight percent of azodicarbonamide as foaming agent was charged into the hopper 1b, and the screw 1d was driven with the heating means so adjusted that the resin passing through the extruder 1a was heated to 180° C and kneaded together with the glass fiber and foaming agent and extruded at a rate of 20 kg/hr. through the screen pack to the second step section.

The second step: The melted mixture from the previous step, while proceeding in the thermally decomposing means 2a, was heated to 210° to 220° C and pressurized to 140 to 150 kg/cm$^2$, whereby the foaming agent was decomposed to produce microbubbles with the substantial foaming suppressed and the microbubbles uniformly distributed in the melted resin, the resultant system proceeding to the next step section.

The third and fourth steps: The melted mixture with the substantial foaming suppressed was forced in the foaming die 3a with its wall temperature maintained at 140° to 160° C. Then, the foamed body was cooled through the sizing die 4a and the cooling water trough 8, and was then taken off by the take-off means 9, thus obtaining a continuous foamed body 10 in a strip-like form with sectional dimensions of about 10 mm by 300 mm and having a 1.5-mm thick dense outer skin layer and an inner portion of a uniform foam structure.

The surface skin layer of the foamed body obtained had a very smooth and wood-like appearance, with its foaming factor being nearly 1. The foaming factor of the whole body inclusive of the skin layer was 2, and the foaming efficiency of the foaming agent was about 45 percent.

REFERENCE EXAMPLE 5

A foamed body obtained in a process similar to Example 9 except that no glass fiber was added had a foaming factor of 2 for the whole foamed body inclusive of the skin layer, which factor is the same as that in Example 9. However, the surface was like a pitted face with traces of rupture of bubbles and lacked in the woodlike appearance obtained in Example 9.

EXAMPLE 10

Apparatus: The same apparatus as in Example 6 was used.

The first step: A dry blend of high density polyethylene (with melt index of 10.0 and density of 0.96) and 0.1 weight percent of 2,5-dimethyl 2,5-di-(t-dibutylperoxy)-hexyne-3 as free radical producing agent was subjected to a crosslinking treatment at an extrusion temperature of 200° C to obtain crosslinked polyethylene pellets, and a dry blend of these pellets, 1 weight percent of azodicarbonamide as foaming agent A and 0.1 weight percent of "Vinifol SW No. 7" (a product manufactured by Eiwa Kasei Corporation and with decomposition temperature of 173° C) as foaming agent B was charged into the hopper 1b of the extruder while driving the screw 1d with the heating means so adjusted that the resin passing through the extruder 1a was heated to 155° to 160° C and kneaded together with the foaming agents without causing the decomposition of the foaming agents and extruded at a rate of 20 kg/hr. into the thermally decomposing means 2a.

The second step: The melted mixture, while proceeding in the thermally decomposing means 2a, was heated to 180° to 185° C and pressurized to 140 to 150 kg/cm$^2$, whereby the foaming agent B was decomposed without the foaming agent A being decomposed to produce microbubbles with the substantial foaming suppressed and the microbubbles uniformly distributed in the melted resin, the resultant system being passed to the next step section.

The third and fourth steps: The melted mixture forced into the foaming die 3a was heated to 200° to 205° C except for a surface portion by the heater 3e provided in the resin passage, whereby the foaming agent A and any remaining non-decomposed part of the foaming agent B were decomposed to cause continued foaming of the inner portion. Then, the foamed body was introduced into the sizing die 4a and cooled as it was brought into contact with the inner wall of the sizing die, and then it was taken off by the take-off means 9 at a speed of 28 cm/min.

The foamed body thus obtained in a strip-like form with sectional dimensions of 120 mm by 20 mm has an about 2-mm thick outer skin layer of a foaming factor of 1.05. The inner portion of the foamed body had a foaming factor of 2.5 and a very uniform foam structure. The foaming factor of the whole foamed body was 2, and the foaming efficiency of the foaming agents was about 40 percent. The surface obtained was very beautiful and has a wood-like appearance.

What is claimed is:

1. A method of continuously extruding a thermoplastic body having a foamed inner portion and a dense surface layer from a thermoplastic resin selected from the group consisting of polyethylene, polypropylene, polystyrene and a mixture thereof comprising:
   a. a first step of melting and kneading in a screw extruder a mixture of a thermoplastic resin and a thermally decomposable foaming agent having a decomposition temperature higher than the softening temperature of the resin, at a temperature above the softening temperature of the resin and below the decomposition temperature of the foaming agent;
   b. a second step of heating the resulting mass of molten mixture, under pressure without substantial mixing action, to a temperature above the decomposition temperature of the foaming agent, by forcing the mass through a thermally decomposing means provided with external heating means and having an outlet of such smaller cross-section than its inlet such that a sufficient pressure is maintained on the mass to suppress substantial foaming in the mass;
   c. a third step of expanding the inner portion of the mass and simultaneously suppressing substantial foaming in the exterior surface of the mass under reduced pressure by forcing the mass through a foaming die having an outlet of larger cross-section than its inlet, said foaming die including a channel and walls, the walls of the channel being maintained at such low temperature, which is below the decomposition temperature of the foaming agent, but above the softening temperature of said resin, as to cool, and thereby suppress substantial foaming in the exterior surfaces of the mass which are in contact with those walls; and
   d. a fourth step of rapidly cooling the mass to a temperature below the softening temperature of the resin, by forcing the mass through a sizing die, which is a channel having walls maintained at a sufficiently low temperature such that the exterior surfaces of the mass, being in contact with said walls, are solidified within 10 seconds after the mass has been introduced into the channel.

2. A method according to claim 1 wherein said thermoplastic resin is a member of the group consisting of; a mixture of a polyolefine and 1 to 0.1 percent by weight of a crosslinking agent based on the total weight of the polyolefine and a crosslinking agent; and a polyolefine prepared by heating such mixture to a temperature above the thermal decomposition temperature of the crosslinking agent.

3. A method according to claim 1 wherein a quantity of glass fibers with an average length of at least 3 millimeters is added to the thermoplastic resin.

4. A method according to claim 1 wherein the thermoplastic resin contains a plurality of thermally decomposable foaming agents having different decomposition temperatures higher than the softening temperature of the thermoplastic resin; the mixture is heated in the second step to a temperature intermediate between the highest and lowest decomposition temperatures of the foaming agents under a pressure sufficient to suppress substantial foaming; and the internal portion of the mixture is heated in the third step to a temperature above the highest decomposition temperatures of the foaming agents by means of an electrical resistance heater positioned within the foaming die for heating only the internal portion of the mixture.

5. A method according to claim 4 wherein said thermoplastic resin is a member of the group consisting of; a mixture of a polyolefine and 1 to 0.1 percent by weight of a crosslinking agent based on the total weight of the polyolefine and crosslinking agent; and a polyolefine prepared by heating such mixture to a temperature above the thermal decomposition temperature of the crosslinking agent.

6. A method according to claim 4 wherein a quantity of glass fibers with an average length of at least 3 millimeters is added to the thermoplastic resin.

* * * * *